US 11,815,436 B2

(12) United States Patent
Wang et al.

(10) Patent No.: US 11,815,436 B2
(45) Date of Patent: Nov. 14, 2023

(54) DETECTION OF SURFACE PARTICLES ON CHAMBER COMPONENTS WITH CARBON DIOXIDE

(71) Applicant: APPLIED MATERIALS, INC., Santa Clara, CA (US)

(72) Inventors: Changgong Wang, San Jose, CA (US); Zhili Zuo, Santa Clara, CA (US); Chang Ke, Sunnyvale, CA (US); Song-Moon Suh, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/819,255

(22) Filed: Aug. 11, 2022

(65) Prior Publication Data

US 2022/0381653 A1 Dec. 1, 2022

Related U.S. Application Data

(63) Continuation of application No. 16/529,630, filed on Aug. 1, 2019, now Pat. No. 11,441,974.

(51) Int. Cl.
| | |
|---|---|
| *G01N 1/02* | (2006.01) |
| *G01N 15/02* | (2006.01) |
| *G01N 15/06* | (2006.01) |
| *G01N 15/14* | (2006.01) |
| *G01N 15/00* | (2006.01) |

(52) U.S. Cl.
CPC ............... *G01N 1/02* (2013.01); *G01N 15/02* (2013.01); *G01N 15/065* (2013.01); *G01N 15/14* (2013.01);

(Continued)

(58) Field of Classification Search
CPC .......... G01N 15/02; G01N 2015/0019; G01N 2015/0294; G01N 1/2202; G01N 1/2205;
(Continued)

(56) References Cited

U.S. PATENT DOCUMENTS

| | | | |
|---|---|---|---|
| 4,751,759 | A | 6/1988 | Zoell |
| 5,806,544 | A | 9/1998 | Kosic |

(Continued)

FOREIGN PATENT DOCUMENTS

| | | |
|---|---|---|
| EP | 461476 | 12/1991 |
| EP | 288263 | 12/1992 |
| WO | 2016135989 A1 | 9/2016 |

OTHER PUBLICATIONS

Kuang, C. "Ultrafine Condensation Particle Counter Instrument Handbook" U.S. Department of Energy, DOE/SC-ARM-TR-146, Feb. 2016. (Year: 2016).*

(Continued)

*Primary Examiner* — Paul M. West
(74) *Attorney, Agent, or Firm* — Lowenstein Sandler LLP

(57) ABSTRACT

A stream including at least one of solid $CO_2$ particles or $CO_2$ droplets is directed toward an article including surface particles. The stream causes at least a portion of the surface particles on the article to dislodge from a surface of the article. A purge cycle to transport at least a portion of the dislodged surface particles away from the surface of the article is initiated. The purge cycle includes generating a laminar flow at a first velocity for a first time period and subsequently generating a laminar flow at a second velocity for a second time period. A determination is made of whether a number of particles transported away from the surface of the article satisfies a particle criterion. In response to a determination that the number of particles transported away from the article does not satisfy the criterion, the purge cycle is re-initiated.

20 Claims, 7 Drawing Sheets

(52) U.S. Cl.
CPC .......... *G01N 2001/028* (2013.01); *G01N 2015/0019* (2013.01); *G01N 2015/0294* (2013.01); *G01N 2015/1493* (2013.01); *G01N 2015/1497* (2013.01)

(58) Field of Classification Search
CPC .......... G01N 1/2208; G01N 1/2211; G01N 2001/028
See application file for complete search history.

(56) References Cited

U.S. PATENT DOCUMENTS

| | | |
|---|---|---|
| 5,853,128 A | 12/1998 | Bowen et al. |
| 6,554,909 B1 | 4/2003 | Haerle et al. |
| 6,875,286 B2 | 4/2005 | Cotte et al. |
| 2002/0100416 A1 | 8/2002 | Sun et al. |
| 2004/0011378 A1 | 1/2004 | Jackson |
| 2012/0137792 A1 | 6/2012 | Bunker |
| 2013/0040538 A1 | 2/2013 | Scrivani et al. |
| 2016/0016286 A1 | 1/2016 | Suh et al. |
| 2018/0128733 A1 | 5/2018 | Goradia et al. |
| 2020/0072724 A1 | 3/2020 | Knollenberg et al. |

OTHER PUBLICATIONS

International Search Report and Written Opinion for International Application No. PCT/US2020/043902, dated Nov. 9, 2020, 9 pages.
"Sherman, R. (Jan. 23, 2007). ""Carbon Dioxide Snow Cleaning, Particulate Science andTechnology: An International Journal""", 25:1, 37-57."

* cited by examiner

```
                        ┌─────────┐
                        │  START  │  ╱─ 700
                        └────┬────┘
                             │
   ┌─────────────────────────▼──────────────────────────────────┐
   │ Determine, using a real-time aerosol sampling component, a │
   │ particle number concentration, a particle size, and/or a   │
   │ particle size distribution for background particles in a   │
   │ particle detection chamber 710                             │
   └─────────────────────────┬──────────────────────────────────┘
                             │
   ┌─────────────────────────▼──────────────────────────────────┐
   │ Provide an article including surface particles to the      │
   │ particle detection chamber 720                             │
   └─────────────────────────┬──────────────────────────────────┘
                             │
   ┌─────────────────────────▼──────────────────────────────────┐
   │ Direct a CO₂ stream toward the article causing a portion   │
   │ of the surface particles to dislodge from the surface of   │
   │ the article 730                                            │
   └─────────────────────────┬──────────────────────────────────┘
                             │
   ┌─────────────────────────▼──────────────────────────────────┐
   │ Generate a laminar flow around the article to transport    │
   │ the dislodged surface particles aerosol sampling           │
   │ component 740                                              │
   └─────────────────────────┬──────────────────────────────────┘
                             │
   ┌─────────────────────────▼──────────────────────────────────┐
   │ Collect, by the aerosol sampling component, a portion of   │
   │ the dislodged surface particles 750                        │
   └─────────────────────────┬──────────────────────────────────┘
                             │
   ┌─────────────────────────▼──────────────────────────────────┐
   │ Determine, in real-time, a particle number concentration,  │
   │ a particle size, and/or a particle size distribution for   │
   │ the dislodged surface particles collected by the aerosol   │
   │ sampling component 760                                     │
   └─────────────────────────┬──────────────────────────────────┘
                             │
   ┌─────────────────────────▼──────────────────────────────────┐
   │ Purge the particle detection chamber to dislodge the       │
   │ surface particles that redeposited on one or more inner    │
   │ walls and/or the article support assembly of the particle  │
   │ detection chamber 770                                      │
   └─────────────────────────┬──────────────────────────────────┘
                             │
                        ┌────▼────┐
                        │   END   │
                        └─────────┘
```

FIG. 7

DETECTION OF SURFACE PARTICLES ON CHAMBER COMPONENTS WITH CARBON DIOXIDE

RELATED APPLICATIONS

This application is a continuation of U.S. application Ser. No. 16/529,630, filed Aug. 1, 2019, the contents of which are entirely incorporated by reference.

TECHNICAL FIELD

Embodiments of the present disclosure relate, in general, to detection of surface particles of chamber components based on use of $CO_2$, specifically, a stream of solid $CO_2$ particles and/or liquid $CO_2$ droplets.

BACKGROUND

The presence of particles on surfaces of components used in manufacturing semiconductor devices presents a common challenge in the semiconductor industry. A full understanding of the type of particles, as well as the quantity of particles, on the surfaces of these components can be helpful in controlling the semiconductor device manufacturing process. Without detecting and controlling these surface particles, contamination may be introduced into a semiconductor process chamber, which could result in significant defects in a final product. For example, ceramic particles deposited on a component surface (e.g., yttrium oxide, aluminum oxide, zirconium oxide, etc.) tend to peel off during exposure to vacuum and plasma conditions, resulting in wafer defects and yield loss.

Standard surface particle detection methods are often ineffective in detecting a significant portion of particles on one or more surfaces of a component. For example, liquid particle counters (LPCs) are unable to detect surface particles that are less than 100 nm in size efficiently, are unable to provide a composition of the surface particles, and are likely to introduce cross contamination from the liquid used to analyze the surface particles, making it difficult to obtain accurate data regarding the surface particles. Further, LPCs are unable to target a particular surface of a component for analysis, thus making it difficult to distinguish particles from one surface of the component. Instruments that use sniffing techniques (i.e., dislodging particles from a surface by gentle air flow and collecting the dislodged particles for analysis) are also unable to detect surface particles that are less than 100 nm in size as the air flow used for this technique is too gentle to effectively dislodge particles that are less than 100 nm in size. Because standard surface particle detection methods fail to provide accurate surface particle metrology, the understanding and control of surface particles in the semiconductor industry is limited and a significant number of defects may occur during the manufacturing process. These limitations may drive up the cost of manufacturing chamber components sometimes as much as three-fold or greater.

SUMMARY

Some of the embodiments described herein cover a method of directing, from a distribution unit, a stream of solid $CO_2$ particles and/or $CO_2$ droplets toward an article, where the article includes surface particles. The stream including solid $CO_2$ particles and/or $CO_2$ droplets causes a portion of the surface particles on the article to dislodge from the surface of the article and become airborne. A portion of these surface particles may then be collected on a surface of a substrate having a pre-determined initial state. The pre-determined initial state may include known initial surface particles on the surface of the substrate. The surface of the substrate may be analyzed after performing the collecting. A size, a morphology, a chemical composition, a particle number concentration, and/or a particle size distribution of the portion of surface particles that were dislodged from the surface of the article and collected on the surface of the substrate may be determined.

In some embodiments, an apparatus includes a distribution unit configured to generate a stream of solid $CO_2$ particles or $CO_2$ droplets. The apparatus further includes a controller configured to direct the stream of solid $CO_2$ particles or $CO_2$ droplets toward an article including surface particles, where the stream causes a portion of the surface particles on the article to dislodge from the surface of the article. The apparatus also includes a substrate, having a pre-determined initial state of surface particles on the surface of the substrate, where a surface of the substrate is to collect the portion of surface particles dislodged from the surface of the article. The surface of the article is to be analyzed to determine a size, a morphology, a chemical composition, a particle number concentration, or a particle size distribution of the portion of the surface particles that were dislodged from the surface of the article and collected on the surface of the substrate.

In some embodiments, an apparatus includes a distribution unit configured to generate a stream of solid $CO_2$ particles or $CO_2$ droplets. The apparatus further includes a controller configured to direct the stream including solid $CO_2$ particles or $CO_2$ droplets toward an article including surface particles. The stream causes a portion of the surface particles on the article to dislodge from the surface of the article. The apparatus also includes a real-time aerosol sampling component configured to collect the surface particles dislodged from the surface of the article, where the collected portion of surface particles is to be analyzed to determine, in real-time, a particle number concentration, a particle size, or a particle size distribution.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

FIG. 7 illustrates another method for detecting and measuring particles on one or more surfaces of an article, in accordance with embodiments of the present disclosure.

DETAILED DESCRIPTION OF EMBODIMENTS

Figure 1:
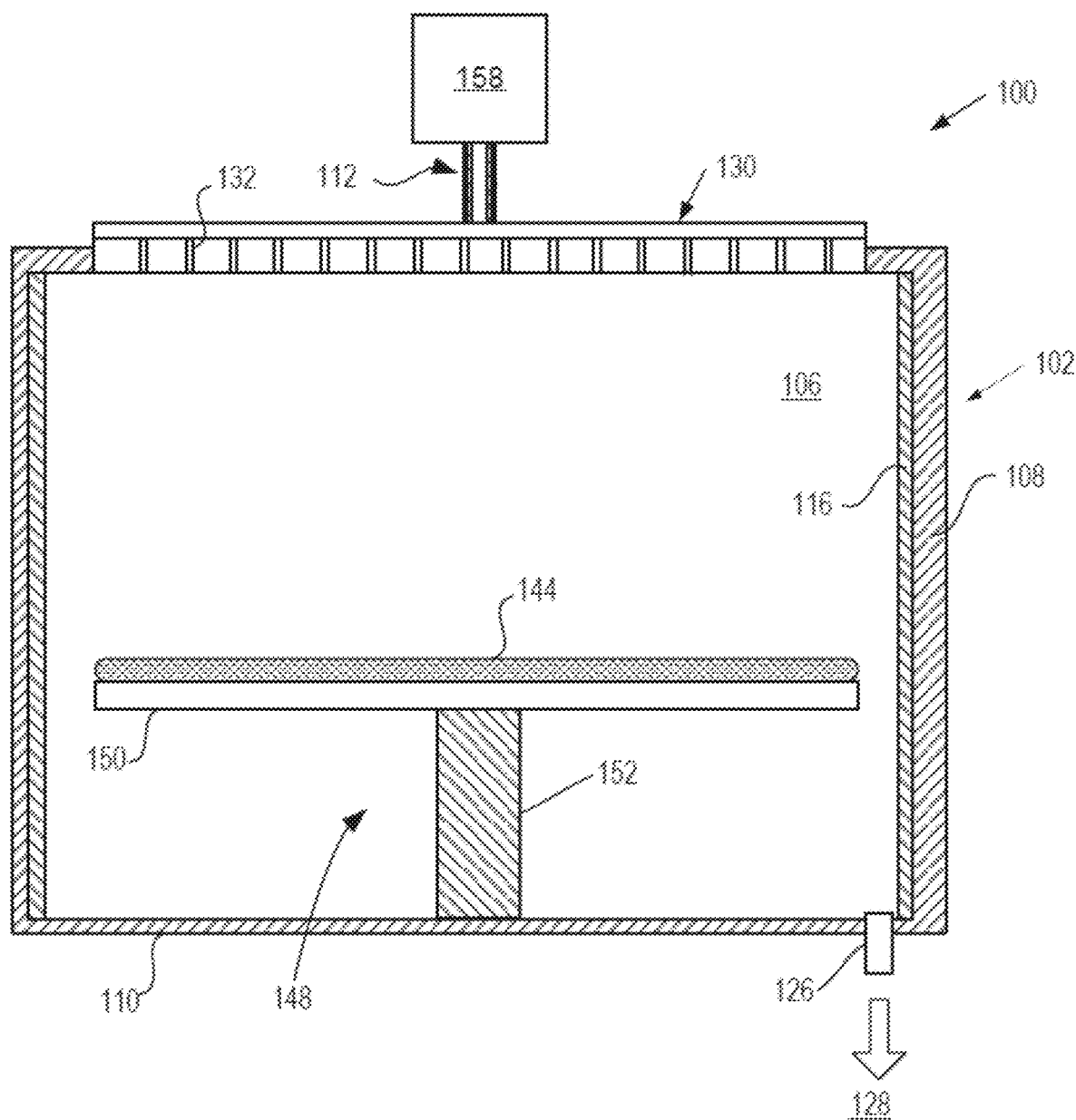
FIG. 1 depicts a sectional view of a processing chamber, in accordance with embodiments of the present disclosure.

Embodiments described herein relate to systems and methods for determining a size, a morphology, a chemical composition, a particle number concentration, and/or a particle size distribution of a portion of particles on a surface of an article. A stream of solid $CO_2$ particles and/or liquid $CO_2$ droplets may be directed toward a surface of the article to dislodge the portion of surface particles. A portion of the dislodged surface particles may be collected by one or more surface particle collection components, such as a clean substrate and/or a real-time aerosol sampling component. The collected surface particles may be analyzed to determine a size, a morphology, a chemical composition, a particle number concentration, and/or a particle size distribution of the collected surface particles. Based on the analysis, information about a size, a morphology, a chemical composition, a particle number concentration, and/or a particle size distribution may be determined for a remainder of the surface particles on the article.

In one embodiment, liquid $CO_2$ may be pumped from a liquid $CO_2$ source, via a supply line, to a spray nozzle at a pressure of between about 400 pounds per square inch (psi) to about 1,200 psi. The liquid $CO_2$ may be converted into a stream of pressurized solid $CO_2$ particles and/or liquid $CO_2$ droplets as the liquid $CO_2$ leaves the spray nozzle. The stream of solid $CO_2$ particles and/or liquid $CO_2$ droplets may exit through an aperture of the spray nozzle having a diameter that is between about 0.25 mm and about 1.25 mm. In some embodiments, the spray nozzle may be positioned at a distance of about 0.25 inches to about 4 inches from the surface of the article. In some embodiments, the spray nozzle may be positioned and maintained at an angle of between about 15° and about 75° relative to the surface of the article. The spray nozzle may be automatically and/or manually adjustable, so the spray nozzle is placed at an appropriate distance away from the article and at an appropriate angle relative to the surface of article. In some embodiments, the spray nozzle may be part of a hand-held $CO_2$ jet of a portable particle detection unit. In some embodiments, the spray nozzle is attached to a robot arm or otherwise movable assembly that may be repositioned based on instructions from a controller.

The stream of solid $CO_2$ particles and/or liquid $CO_2$ droplets is directed toward the article, causing at least a portion of surface particles on the article to be dislodged. The stream of solid $CO_2$ particles and/or liquid $CO_2$ droplets may dislodge surface particles, including particles less than 100 nm in size. In some embodiments, the surface particles may include at least one of: YO—AlZr, YO—Al, YOF—AlZr, Si—YOF—AlZr, YO(Zr), AlO, YFO(Al), SiO, or YFO particles. The type of surface particles may depend on the materials of the component at which the stream of solid $CO_2$ particles and/or liquid $CO_2$ droplets is directed.

In one embodiment, a portion of the dislodged particles may be collected on a clean substrate. The substrate may have been previously analyzed to determine at least a morphology, a chemical composition, a particle number concentration, and/or a particle size distribution of surface particles on the surface of the substrate. After the portion of dislodged particles from the article has been collected on the substrate, the substrate may be analyzed to determine a morphology, a chemical composition, a particle number concentration, and/or a particle size distribution of all particles on the surface of the substrate. Data about the initially present particles may be subtracted from the data about all particles subsequently present on the substrate (after collecting surface particles). Based on the analysis performed prior to collecting the dislodged surface particles, and the analysis performed after collecting the dislodged surface particles, information about a morphology, a chemical composition, a particle number concentration, and/or a particle size distribution of the remainder of surface particles on the article can be determined. This information can be used to determine whether further cleaning of the article should be performed before the article is used in a manufacturing process or to root cause particles excursion.

The portion of the dislodged particles may additionally or alternatively be collected by a real-time aerosol sampling component. The real-time aerosol sampling component may be an optical particle counter, a laser particle counter, an aerodynamic particle sizer, a condensation particle counter, or an ultrafine condensation particle counter. In some embodiments, the real-time aerosol sampling component may have determined a particle number concentration, a particle size, and/or a particle size distribution for one or more particles of the particle detection system (referred to herein as background particles) prior to collecting the dislodged surface particles. After the portion of dislodged particles have been collected by the aerosol sampling component, a particle number concentration, a particle size, and/or a particle size distribution may be determined, in real-time, for all particles detected by the aerosol sampling component (i.e., background particles and collected dislodged particles). Based on the analysis performed prior to collecting the dislodged surface particles, and the analysis performed after collecting the dislodged surface particles, information about the particle number concentration, the particle size, and/or the particle size distribution for the remainder of surface particles on the article can be determined. In some embodiments, the substrate and the real-time aerosol sampling component may be used in parallel to analyze the dislodged surface particles.

In some embodiments, a laminar flow may be provided within the particle detection system to facilitate the transport of dislodged surface particles from the article to the one or more surface particle detection components. The laminar flow may be generated by providing air from an exterior of the particle detection system through a flow straightener provided at an inlet of the particle detection system. In some embodiments, a pre-filter and/or a high efficiency particulate air filter may be provided along with the flow straightener to remove particles from the exterior air source that may interfere with the detection of the dislodged surface particles by the surface particle detection components. In some embodiments, one or more particle charge neutralizers may be provided within the particle detection system to reduce an amount of charge carried by the dislodged surface particles being transported to the surface particle detection components.

It may be advantageous to detect particles on the surface of an article to determine whether, before the article is used in a manufacturing process, further processing and/or cleaning of the article is needed. A size, a morphology, a chemical composition, a particle number concentration, and/or a particle size distribution of the particles on the surface of the article may indicate additional processing and/or cleaning steps to be performed, before using the article in the manufacturing process. It may be advantageous to use a stream of solid $CO_2$ particles and/or liquid $CO_2$ droplets to dislodge particles from one or more surfaces of the article. The stream of solid $CO_2$ particles and/or liquid $CO_2$ droplets improves the detection of surface particles as the $CO_2$ stream dislodges small particles on the surface of the article, including particles smaller than 100 nm in size. By dislodging particles smaller than 100 nm in size from the surface of the article, an accurate size, morphology, chemical composition, particle number concentration, and/or particle size distribution of the particles on the surface of the article may be determined. It may be further advantageous to use the stream of solid $CO_2$ particles and/or liquid $CO_2$ droplets to dislodge the surface particles as the $CO_2$ stream may not interfere with a functionality of the article. Further, the $CO_2$ stream may be directed to select portions of a surface of the article, so to determine a size, a morphology, a chemical composition, a particle number concentration, and/or a particle size distribution of a select portion of the surface rather than the entire surface of the article. Such information may indicate whether a targeted processing and/or cleaning step may be performed prior to using the article in the manufacturing process.

Embodiments are discussed with regards to the detection of surface particles attached or deposited on a surface of a chamber component. However, it should be understood that embodiments described herein also apply to the detection of surface particles deposited on a surface of other manufactured components.

FIG. 1 depicts a sectional view of a processing chamber 100, in accordance with embodiments of the present disclosure. The processing chamber 100 may be used for processes in which a corrosive plasma environment is provided. For example, the processing chamber 100 may be a chamber for a plasma etcher or plasma etch reactor, a plasma cleaner, and so forth. In alternative embodiments other processing chambers may be used, which may or may not be exposed to a corrosive plasma environment. Some examples of chamber components include a chemical vapor deposition (CVD) chamber, a physical vapor deposition (PVD) chamber, an atomic layer deposition (ALD) chamber, an ion assisted deposition (IAD) chamber, an etch chamber, and other types of processing chambers.

Examples of chamber components that may be analyzed for surface particles according to embodiments described herein include, but are not limited to, a substrate support assembly 148, an electrostatic chuck (ESC) 150, a gas distribution plate, a nozzle, a showerhead, a flow equalizer, a cooling base, a gas feeder, a chamber lid, a liner, a ring, a view port, and so on. Embodiments may be used with chamber components that include one or more apertures as well as with chamber components that do not include any apertures. The chamber component may be a ceramic article having a compositing of at least one of $Al_2O_3$, AlN, $SiO_2$, $Y_3Al_5O_{12}$, $Y_4Al_2O_9$, $Y_2O_3$, $Er_2O_3$, $Gd_2O_3$, $Gd_3Al_5O_{12}$, $YF_3$, $Nd_2O_3$, $Er_4Al_2O_9$, $Er_3Al_5O_{12}$, $ErAlO_3$, $Gd_4Al_2O_9$, $GdAlO_3$, $Nd_3Al_5O_{12}$, $Nd_4Al_2O_9$, $NdAlO_3$, or a ceramic compound composed of $Y_4Al_2O_9$ and a solid-solution of $Y_2O_3$—$ZrO_2$. Alternatively, the chamber component may be another ceramic, may be a metal (e.g., Al, stainless steel, etc.), or a metal alloy. The chamber component may also include both a ceramic portion and a non-ceramic (e.g., metal) portion.

In one embodiment, the processing chamber 100 includes a chamber body 102 and a showerhead 130 that encloses an interior volume 106. The showerhead 130 may include a showerhead base and a showerhead gas distribution plate. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel or other suitable material such as titanium (Ti). The chamber body 102 generally includes sidewalls 108 and a bottom 110.

An outer liner 116 may be disposed adjacent the sidewalls 108 to protect the chamber body 102. The outer liner 116 may be fabricated to include one or more apertures. In one embodiment, the outer liner 116 is fabricated from aluminum oxide.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

The showerhead 130 may be supported on the sidewall 108 of the chamber body 102. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or cleaning gases to the interior volume 106 through the showerhead 130 or lid and nozzle (e.g., through apertures of the showerhead or lid and nozzle). Showerhead 130 may be used for processing chambers used for dielectric etch (etching of dielectric materials). The showerhead 130 may include a gas distribution plate (GDP) and may have multiple gas delivery holes 132 (also referred to as channels) throughout the GDP. The showerhead 130 may be formed by metal or alloy plate with the protection by a multi-layer protective coating as described herein. The metal or alloy plate may be composed of aluminum, an aluminum alloy, or another metal or metal alloy. The showerhead 130 may be formed with the GDP bonded to an aluminum base or an anodized aluminum base. The GDP may be made from Si or SiC, or may be a ceramic such as $Y_2O_3$, $Al_2O_3$, $Y_3Al_5O_{12}$ (YAG), and so forth.

For processing chambers used for conductor etch (etching of conductive materials), a lid may be used rather than a showerhead. The lid may include a center nozzle that fits into a center hole of the lid. The lid may be a ceramic such as $Al_2O_3$, $Y_2O_3$, YAG, or a ceramic compound including $Y_4Al_2O_9$ and a solid-solution of $Y_2O_3$—$ZrO_2$. The nozzle may also be a ceramic, such as $Y_2O_3$, YAG, or the ceramic compound including $Y_4Al_2O_9$ and a solid-solution of $Y_2O_3$—$ZrO_2$.

Examples of processing gases that may be used to process substrates in the processing chamber 100 include halogen-containing gases, such as $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. A remote plasma may be formed from any of these and/or other processing gases and then delivered through the plasma delivery line 112 to chamber 100. Accordingly, the remote plasma may be composed of $C_2F_6$, $SF_6$, $SiCl_4$, HBr, $NF_3$, $CF_4$, $CHF_3$, $CH_2F_3$, F, $NF_3$, $Cl_2$, $CCl_4$, $BCl_3$ and $SiF_4$, among others, and other gases such as $O_2$, or $N_2O$. Examples of carrier gases include $N_2$, He, Ar, and other gases inert to process gases (e.g., non-reactive gases).

A substrate support assembly 148 is disposed in the interior volume 106 of the processing chamber 100 below the showerhead 130. The substrate support assembly 148 holds a substrate 144 during processing. A ring (e.g., a single ring) may cover a portion of the electrostatic chuck 150, and may protect the covered portion from exposure to plasma during processing. The ring may be silicon or quartz in one embodiment.

An inner liner may be coated on the periphery of the substrate support assembly 148. The inner liner may be a halogen-containing gas resist material such as those discussed with reference to the outer liner 116. In one embodiment, the inner liner may be fabricated from the same materials of the outer liner 116.

In one embodiment, the substrate support assembly 148 includes a pedestal 152 that supports an electrostatic chuck 150. The electrostatic chuck 150 further includes a thermally conductive base and an electrostatic puck bonded to the thermally conductive base by a bond, which may be a silicone bond in one embodiment. The thermally conductive base and/or electrostatic puck of the electrostatic chuck 150 may include one or more optional embedded heating elements, embedded thermal isolators and/or conduits to control a lateral temperature profile of the substrate support assembly 148. The electrostatic puck may further include a multiple gas passages such as grooves, mesas and other surface features that may be formed in an upper surface of the electrostatic puck. The gas passages may be fluidly coupled to a source of a heat transfer (or backside) gas such as He via holes drilled in the electrostatic puck. In operation, the backside gas may be provided at controlled pressure into the gas passages to enhance the heat transfer between the electrostatic puck and a supported substrate 144. The electrostatic chuck 150 may include at least one clamping electrode controlled by a chucking power source.

Figures 2, 3:
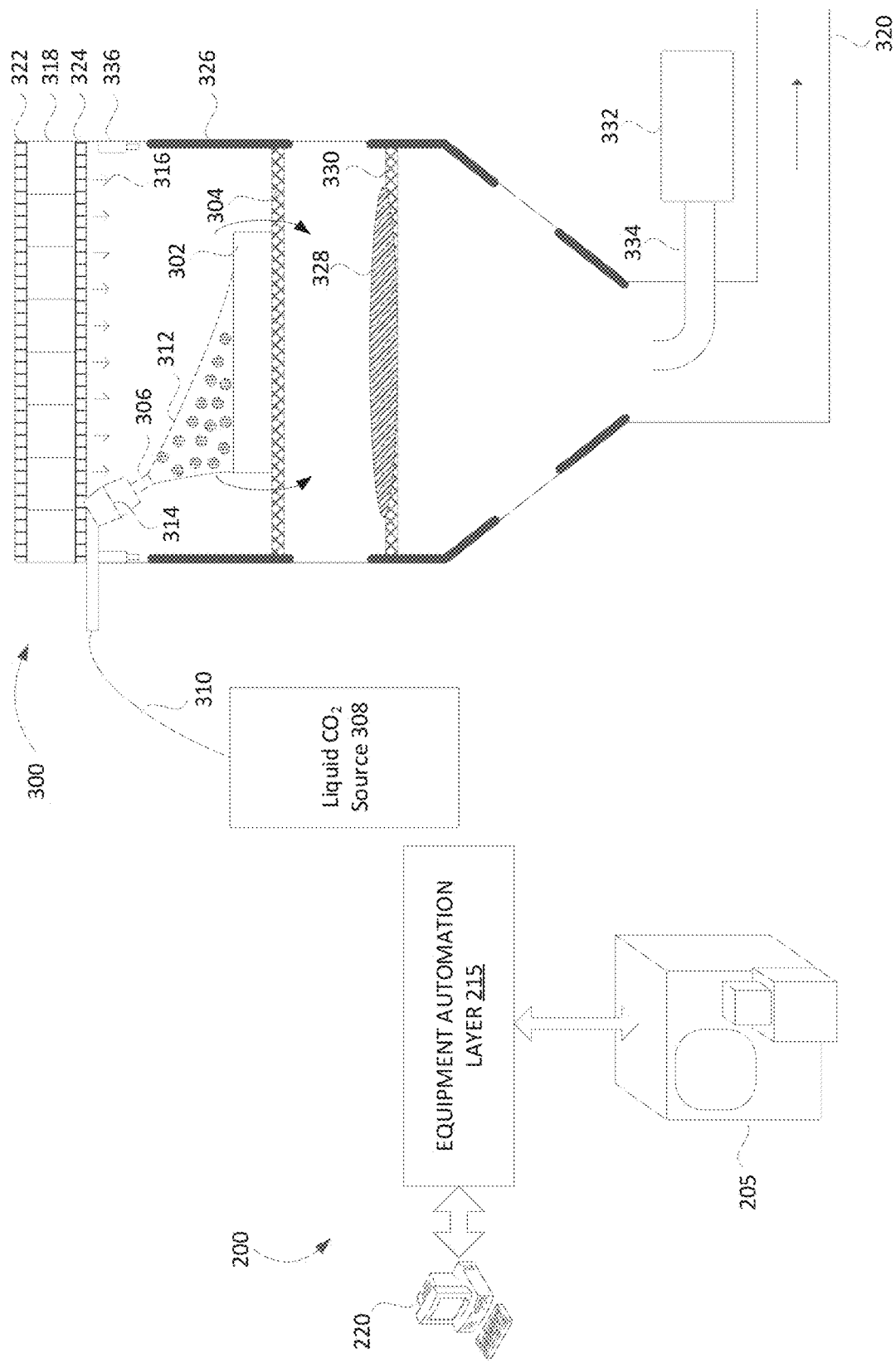
FIG. 2 depicts an exemplary architecture of a manufacturing system, in accordance with embodiments of the present disclosure.
FIG. 3 depicts a sectional view of a particle detection chamber, in accordance with embodiments of the present disclosure.

FIG. 2 depicts an exemplary architecture of a manufacturing system 200, in accordance with embodiments of the present disclosure. Manufacturing system 200 may be a ceramics manufacturing system, which may include processing chamber 100. Manufacturing system 200 may further include a particle detection system 205, an equipment automation layer 215, and a computing device 220. In alternative embodiments, manufacturing system 200 may include more or fewer components. For example, manufacturing system 200 may include only particle detection system 205, which may be a manual off-line machine.

Particle detection system 205 may be a machine designed to direct a stream of solid $CO_2$ particles and/or $CO_2$ droplets toward one or more surfaces of an article (e.g., a ceramic article for use in a semiconductor processing chamber). Particle detection system 205 may include an adjustable article support assembly used to hold the article in place as the stream of solid $CO_2$ particles and/or $CO_2$ droplets are directed toward the article. Particle detection system 205 may also include a store of liquid $CO_2$ and a distribution unit, such as a spray nozzle, for generating the solid $CO_2$ particles and/or liquid $CO_2$ droplets from the liquid $CO_2$. Further details with respect to particle detection system 205 are provided herein.

Particle detection system 205 may be an off-line machine that can be programmed with a process recipe (e.g., using a programmable controller). The process recipe may control an orientation of the article, $CO_2$ pressure in the distribution unit, orientation of the distribution unit with respect to the article, process time durations, article temperature and/or chamber temperature, or any other suitable parameter. Each process parameter will be discussed in greater detail herein.

Alternatively, particle detection system 205 may be an on-line automated machine that can receive process recipes from computing devices 220 (e.g., personal computers, server machines, etc.) via equipment automation layer 215. The equipment automation layer 215 may interconnect particle detection system 205 with computing devices 220, with other manufacturing machines, with metrology tools, and/or other devices.

Equipment automation layer 215 may include a network (e.g., a location area network (LAN)), routers, gateways, servers, data stores, and so on. Particle detection system 205 may connect to equipment automation layer 215 via a SEMI Equipment Communications Standard/Generic Equipment Model (SECS/GEM) interface, via an Ethernet interface, and/or via other interfaces. In one embodiment, equipment automation layer 215 enables process data to be stored in a data store (not shown). In an alternative embodiment, computing device 220 connects directly to particle detection system 205.

In one embodiment, particle detection system 205 may include a programmable controller that can load, store, and execute process protocols. The programmable controller may control pressure settings, fluid flow settings, time settings, etc., for a process performed by particle detection system 205. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for detecting surface particles on a surface of an article, as described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device, such as an application specific integrated circuit (ASIC), a field programmable gate array (FPGA), a digital signal processor (DSP), a network processor, or the like. In one embodiment, programmable controller is a programmable logic controller (PLC).

FIG. 3 depicts a sectional view of an exemplary particle detection chamber 300, in accordance with embodiments of the present disclosure. For example, the particle detection chamber 300 may be the same or similar to particle detection system 205 described with respect to FIG. 2. Particle detection chamber 300 may be configured to dislodge a portion of particles from at least one surface of an article 302. Article 302 may be any suitable chamber component described with respect to FIG. 1, including a substrate support assembly, an electrostatic chuck (ESC), a chamber wall, a base, a nozzle, a gas distribution plate or showerhead, a liner, a liner kit, a shield, a plasma screen, a flow equalizer, a cooling base, a chamber lid, etc. Article 302 may be a ceramic material, metal-ceramic composite, or a polymer-ceramic composite. Article 302 may have any suitable dimensions for incorporation into a semiconductor chamber. In some embodiments, article 302 may be a newly fabricated chamber component that has not been coated or otherwise processed. In other embodiments, article 302 may be a coated chamber component or may be a used chamber component.

Article 302 may be supported within particle detection chamber 300 by an article support assembly 304. Article support assembly 304 may be automatically and/or manually adjustable to position article 302 during the particle detection process, and may be capable of rotating, tilting, and/or translating article 302 in three dimensions. In some embodiments, article support assembly 304 may be operatively coupled to a programmable controller (not shown), described with respect to FIG. 2. The programmable controller may store one or more process recipes associated with the particle detection process. Each process recipe may include execution protocols relating to an orientation of article support assembly 304. During the particle detection process, the programmable controller may cause article support assembly 304 to be rotated, tilted, and/or translated according to one or more execution protocols of a process recipe.

In some embodiments, article support assembly 304 may be a perforated plate or a mesh screen that is configured to support article 302 within particle detection system 300. The perforated plate or the mesh screen may be made of stainless steel or polytetrafluoroethene (i.e., Teflon) in some embodiments. Particles that are dislodged from a surface of article 302 may pass through the perforated plate or mesh screen during the particle detection process. In other embodiments, article support assembly 304 may include one or more grips (not shown) where each grip is configured to contact surfaces of article 302 to prevent article 302 from slipping. The grips may be applied to article 302 with enough force to firmly hold article 302 in place while also minimizing the contact area with article 302. In some embodiments, article support assembly 304 may include one or more heating elements which may be activated to control a temperature of article 302.

Particle detection chamber 300 may also include a distribution unit, such as spray nozzle 306. Spray nozzle 306 may be fluidly coupled to a liquid $CO_2$ source 308 via a supply line 310. Supply line 310 may include one or more valves for controlling the liquid $CO_2$ being provided to spray nozzle 306. Additionally, a pump (not shown) may be used to pump liquid $CO_2$ from liquid $CO_2$ source 308 through spray nozzle 306 and to control the pressure of the liquid $CO_2$.

Liquid $CO_2$ may be pumped from liquid $CO_2$ source 308 through spray nozzle 306 and directed to a portion of a surface of article 302. As liquid $CO_2$ exits spray nozzle 306, the liquid $CO_2$ may be converted to a stream 312 of solid $CO_2$ particles and/or liquid $CO_2$ droplets (herein referred to as a $CO_2$ stream) directed toward article 302. In some embodiments, the liquid $CO_2$ may be supplied to spray nozzle 306 at a pressure between about 400 psi to about 1,200 psi. In one embodiment, liquid $CO_2$ may be supplied to spray nozzle 306 at a pressure of between about 700 psi to about 900 psi. In some embodiments, spray nozzle 306 may be a throttling nozzle, which causes an isenthalpic expansion of the liquid $CO_2$, such that when the $CO_2$ exits nozzle 306, it expands into the $CO_2$ stream 312. In some embodiments, $CO_2$ stream 312 exits through an aperture of spray nozzle 306 having a diameter that between about 0.25 mm and about 1.25 mm. In one embodiment, the aperture of spray nozzle 306 may have a diameter of less than 1 mm.

Without being bound by theory, it is believed that the solid $CO_2$ particles and liquid $CO_2$ droplets strike surface particles on surfaces of article 302, transferring momentum to the surface particles, causing the surface particles to be dislodged from the surfaces of article 302. In some embodiments, the stream path is oriented at an angle with respect to a surface of article 302, which may provide higher momentum to the surface particles while minimizing damage to article 302 than may occur from orienting the stream path directly toward article 302. In one embodiment, the angle may be between about 15° and about 75°.

Spray nozzle 306 may be positioned and maintained at a distance of about 0.25 inches to about 4 inches from a surface of article 302. In one embodiment, spray nozzle 306 may be positioned and maintained at a distance of about 0.5 inches to about 2 inches from the surface of article 302. Spray nozzle 306 may be automatically and/or manually adjustable such that spray nozzle 306 is placed at an appropriate distance away from article 302 and at an appropriate angle relative to the surface of article 302. In some embodiments, spray nozzle 306 may be operatively coupled to the programmable controller, where one or more process recipes stored by the programmable controller include execution protocols relating to an orientation of spray nozzle 306. In one embodiment, programmable controller may cause spray nozzle 306 to be translated toward or away from article 302, and the angle relative to the surface of article 302 to be increased or decreased, according to one or more execution protocols of a process recipe. Alternatively, or additionally, the orientation of spray nozzle 306 and article support assembly 304 may be adjusted in coordination during the particle detection process, according to one or more execution protocols of a process recipe.

In some embodiments, the liquid $CO_2$ may pass through a fine mesh filter 314 (e.g., a nickel mesh filter) to remove gross particulates (i.e., $CO_2$ particles having a size greater than a spacing of the mesh) from the liquid $CO_2$ source 308 and/or supply line 310 prior to exiting spray nozzle 306. The fine mesh filter 314 may be positioned at an input of nozzle 306, at an output of nozzle 306, or at an intermediate position within nozzle 306.

Spray nozzle 306 may be configured to direct $CO_2$ stream 312 toward article 302 in either a spraying mode or a scanning mode. Spraying mode may include a continuous spraying mode and/or a pulsing spraying mode. Scanning mode may include a point scanning mode and/or an area scan mode. During the continuous spraying mode, $CO_2$ stream 312 may be directed toward article 302 continuously for a first period of time, until a first layer of solid $CO_2$ has formed on a surface of article 302. The first solid $CO_2$ layer may cause a temperature of article 302 to decrease. During the first time period, a portion of the surface particles may be dislodged from the surface of article 302. After the first solid $CO_2$ layer has formed and the portion of surface particles have dislodged, a recovery time period (i.e., a second period of time) may be given to allow the first solid $CO_2$ layer to sublimate (i.e., transition from a solid phase to a gas phase) and the temperature of article 302 to increase. In some embodiments, a temperature of a laminar flow 316 provided within particle detection chamber 300 (described in further detail herein) may be increased to facilitate the increase of the temperature of article 302. In other embodiments, a heating element included in article support assembly 304 may be activated to facilitate the increase of the temperature of article 302. After the first solid $CO_2$ layer has sublimated and the temperature of article 302 has increased to a threshold temperature, $CO_2$ stream 312 may be directed toward article 302 continuously for a third period of time, until a second layer of solid $CO_2$ has formed on a surface of article 302. The second solid $CO_2$ layer may cause a portion of the surface particles to dislodge from the surface of article 302. Another recovery time period (i.e., a fourth period of time) may be given to allow the second solid $CO_2$ layer to sublimate and the temperature of article 302 to increase. The above described process (formation of solid $CO_2$ layer and sublimation) may be performed repeatedly in some embodiments (e.g., until a threshold number of surface particles remain on the surface of article 302). The number of surface particles on the surface of article 302 may be measured after the formation of a solid $CO_2$ layer, in accordance with embodiments described herein.

During the pulsing spraying mode, spray nozzle 306 may be turned on and off periodically with a consistent frequency until it is determined (e.g., by a real-time aerosol sampling component described in further detail herein), that a threshold number of particles have dislodged from the surface of article 302. In some embodiments, a solid $CO_2$ layer may form on the surface of article 302 during the pulsing spraying mode.

As discussed previously, $CO_2$ stream 312 may also be directed in either a point scanning mode or an area scanning mode. During the point scanning mode, spray nozzle 306 may be fixed within particle detection system 300 and targeted to a single portion of a surface of article 302. Particles within the single portion may be dislodged from the surface and analyzed by at least a real-time aerosol sampling instrument 332 to determine at least a particle number concentration, particle size, and/or a particle size distribution of the dislodged particles. The position of spray nozzle 306 relative to the surface of article 302 may change to target different portions on the surface of article 302 during the particle detection process and the dislodged particles from each targeted portion may be analyzed. By targeting different portions of article 302, a level of surface cleanliness for various spots on the surface of article 302 may be determined.

During the area scanning mode, the position of spray nozzle 306, relative to a surface of article 302, may continuously change as $CO_2$ stream 312 is directed toward article 302. In some embodiments, the position of spray nozzle 306 may be changed in a continuous line or a circular pattern on the surface of article 302 at a constant velocity. In one embodiment, the constant velocity may be between about 0.25 inch/s to about 2 inch/s. The dislodged surface particles may be collected and analyzed by at least a real-time aerosol sampling instrument 332 to determine at least a particle number concentration, particle size, and/or particle size distribution of the dislodged surface particles. By continuously changing the area of the surface of article 302 targeted by spray nozzle 306, an averaged article surface cleanliness may be determined.

To prevent dislodged surface particles from re-depositing on a surface of article 302, or from depositing on one or more inner walls of particle detection chamber 300, a laminar flow 316 may be provided within particle detection chamber 300. Laminar flow 316 may be generated by providing air from an exterior of particle detection chamber 300 (referred to herein as carrier air) through a flow straightener 318 provided at an inlet of particle detection chamber 300. In some embodiments, flow straightener 318 may be a honeycomb or a woven stainless steel plate. Laminar flow 316 may be provided through flow straightener 318 at a velocity of between about 0.5 m/s to about 1 m/s. Laminar flow 316 may be provided at the inlet of particle detection chamber 300 and transport dislodged surface particles toward an outlet 320 of particle detection chamber 300. In some embodiments a pre-filter 322 may be provided along with flow straightener 318 to remove particles from the carrier air that may interfere with the detection of surface particles dislodged from a surface of article 302 (referred to herein as background particles). Additionally, a high efficiency particulate air filter 324 may be provided along with flow straightener 318 to remove additional background particles that were not removed by pre-filter 322. In some embodiments, both pre-filter 322 and particulate air filter 324 may be provided upstream from flow straightener 318. In other embodiments, pre-filter 322 may be provided upstream from flow straightener 318 and particulate air filter 324 may be provided downstream from flow straightener 318.

One or more particle charge neutralizers 326 may be provided within particle detection chamber 300 to reduce an amount of charge carried by dislodged surface particles, thereby reducing particle transport loss due to electrostatic attraction. In some embodiments, particle charge neutralizers 326 may be a radioactive source, such as one or more Polonium-210 strips. Particle charge neutralizers may be placed on one or more inner walls of particle detection chamber 300 and may reduce an amount of charge carried by dislodged surface particles as the dislodged surface particles are being transported, by laminar flow 316 toward outlet 320.

A substrate 328 may be provided below article 302 (as illustrated), or on a side of particle detection chamber 300 close to article 302, to collect a sample of dislodged surface particles transported from article 302 toward outlet 320. Substrate 328 may be supported by substrate support assembly 330. Substrate support assembly 330 may be the same as article support assembly 304. Substrate 328 may be any clean surface configured to collect a sample of dislodged surface particles from article 302. In some embodiments, substrate 328 may be a clean wafer that has a diameter of 300 mm or smaller.

A surface of substrate 328 may be analyzed, prior to collecting a portion of dislodged surface particles, to determine a morphology, a chemical composition, a particle number concentration, and/or a particle size distribution of surface particles on the surface of substrate 328. After substrate 328 has collected at least a portion of dislodged surface particles from article 302, substrate 328 may be analyzed to determine a size, a morphology, a chemical composition, a particle number concentration, and/or a particle size distribution of all particles on the surface of substrate 328. Based on the analysis performed prior to collecting the dislodged surface particles, and the analysis performed after collecting the dislodged surface particles, a size, a morphology, a chemical composition, a particle number concentration, a particle size distribution, and/or a total particle count may be of substrate 328 may be determined for the surface particles remaining on article 302 after the particle detection process is complete. Such determination may provide a quantitative indication of a cleanliness of a surface of article 302. In some embodiments, substrate 328 may be analyzed by various metrologies, such as scanning electron microscope (SEM)/energy-dispersive X-ray (EDX) metrology. In other embodiments, substrate 328 may be analyzed by a surface scanning metrology apparatus, such as SurfScan® metrology, manufactured by KLA Corporation, to determine a particle size and total particle count for surface particles on substrate 328.

In some embodiments, particle detection chamber 300 may further include a real-time aerosol sampling component 332. Real-time aerosol sampling component 332 may be provided in parallel with substrate 328, or instead of substrate 328. Aerosol sampling component 332 may be configured to collect at least a portion of dislodged surface particles from a surface of article 302 and determine, in real time, a particle number concentration, a particle size and/or a particle size distribution of the portion of collected dislodged surface particles. Aerosol sampling component 332 may collect and analyze a portion of background particles within particle detection system 300 prior to collecting and analyzing the portion of dislodged surface particles from the surface of article 302. Aerosol sampling component 332 may then collect and analyze the portion of dislodged surface particles from article 302. Based on the analysis performed prior to collecting the dislodged surface particles, and the analysis performed after collecting the dislodged surface particles, a particle number concentration, a particle size, and/or a particle size distribution may be determined for the remainder of surface particles on article 302.

Aerosol sampling component 332 may include at least one of an optical particle counter, a laser particle counter, an aerodynamic particle sizer, a condensation particle counter, or an ultrafine condensation particle counter. In some embodiments, a cascade impactor may be provided in addition to, or instead of, aerosol sampling component 332 to collect dislodged surface particle samples for further analysis (e.g., by SEM/EDX metrology). In some embodiments, a velocity of laminar flow 316 may be adjusted to correspond with a sampling flow velocity of aerosol sampling component 332 such to achieve isokinetic sampling via an aerosol sampling probe 334.

An aerosol sampling probe 334 may be provided as part of aerosol sampling component 332 to collect at least a portion of dislodged surface particles transported from article 302. In some embodiments, aerosol sampling probe 334 may be connected to an aerosol sampling instrument of aerosol sampling component via a tubing. The tubing may have a length of between about 2 inches and 5 inches in some embodiments. In some embodiments, the tubing should be as short as possible to reduce particle transport loss between aerosol sampling probe 334 and the aerosol sampling instrument. The tubing may be composed of a metal, such as stainless steel or Tygon, to reduce surface particle transport loss.

After the dislodged particles are collected by substrate 328 and/or aerosol sampling component 332 and analyzed in accordance with previously described embodiments (i.e., a particle detection cycle is complete), particle detection chamber 300 may be purged to remove at least a portion of dislodged surface particles and/or background particles remaining within the interior of particle detection chamber 300. In some embodiments, particle detection chamber 300 may be purged using aggressive filtered clean dry air (CDA). One or more CDA nozzles 336 provided within particle detection chamber 300 may be targeted toward an inner wall of particle detection chamber 300. CDA may be provided by CDA nozzles 336 to remove any dislodged surface particles that were deposited on an inner wall of particle detection chamber 300, as well as any background particles remaining from a previous particle detection cycle.

In some embodiments, a velocity of laminar flow 316 may also be increased significantly to facilitate dislodging and transport of surface and/or background particles deposited on an inner wall of particle detection chamber 300. In one embodiment, the velocity of laminar flow 316 may be increased to 10 m/s. Aerosol sampling component 332 may collect at least a portion of particles being purged from particle detection chamber 300 and determine, in real-time, at least a particle number concentration of the collected particles.

In some embodiments, a high flow, low flow purge cycle may be performed to purge particles from particle detection chamber 300. In a high flow, low flow purge cycle, the velocity of laminar flow 316 may be increased (e.g., to 10 m/s or higher) within particle deposition chamber 300 for a first period of time (referred to herein as a high flow period). After an expiration of the first period of time, the velocity of laminar flow 316 may be decreased (e.g., to approximately 1 m/s) for a second period of time (referred to herein as a low flow period). Aerosol sampling component 332 may collect at least a portion of particles being purged during the first period of time and the second period of time and determine, in real-time, at least a particle number concentration of the collected particles. The high flow period and the low flow period may be repeated until the particle concentration determined by aerosol sampling component 332 falls below a threshold particle concentration (e.g., 1 particle/cm3). In some embodiments, CDA may be provided by CDA nozzles 336 during the high flow period and the low flow period.

After extensive use of particle detection chamber 300, a particle concentration determined by aerosol sampling component 332 may not fall below a threshold particle concentration by purging particle detection chamber 300, in accordance with previously described embodiments. In some embodiments, one or more inner wall surfaces of particle detection chamber 300 may be cleaned using an isopropyl alcohol (IPA) solution to remove at least a portion of particles deposited on the inner wall surfaces. In one embodiment, a 9% IPA solution may be wiped onto the surface of one or more inner walls to remove at least a portion of the particles. In some embodiments, article support assembly 304 may similarly be cleaned using an IPA solution to remove at least a portion of particles deposited on one or more surfaces of article support assembly 304. In other embodiments, article support assembly 304 may be removed from particle detection chamber 300 and cleaned by an ultrasonicated deionized water bath.

Figure 4:
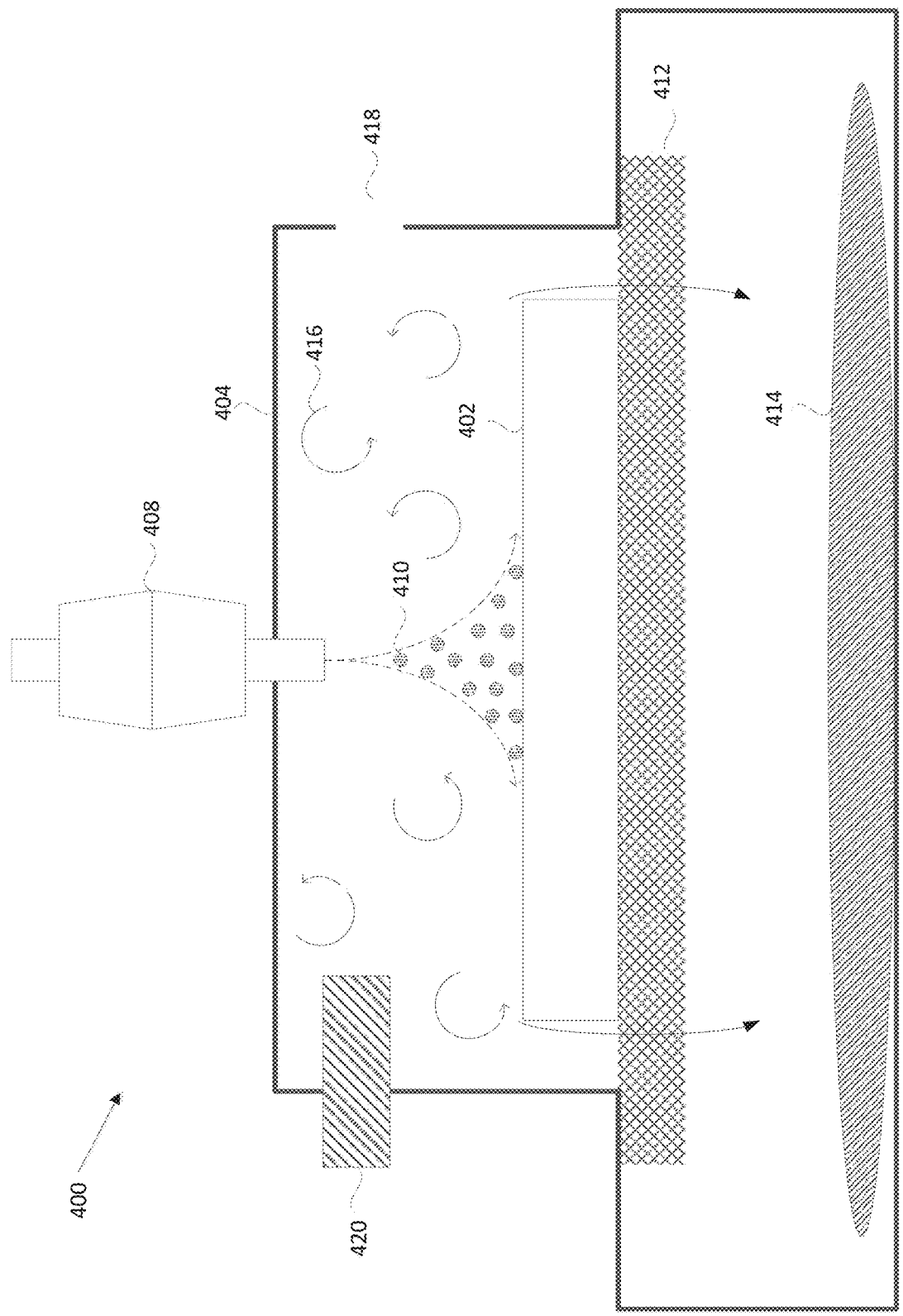
FIG. 4 depicts a sectional view of a particle detection system, in accordance with embodiments of the present disclosure.

FIG. 4 depicts a sectional view of another particle detection system 400, in accordance with embodiments of the present disclosure. Particle detection system 400 may be the same or similar to particle detection system 205 described with respect to FIG. 2. Particle detection system 400 may be configured to dislodge at least a portion of surface particles from at least one surface of an article 402. Article 402 may be any suitable chamber component described with respect to FIG. 1 and FIG. 3.

In some embodiments, particle detection system 400 may include a system body 404, in which article 402 may be provided within system body 404. In some embodiments, system body 404 may be a small, stainless steel fixture, such as a cylindrical stainless steel cup. System body 404 may be configured such to maintain a fixed distance between a distribution unit, such as spray nozzle 408, and article 402. As described with respect to FIG. 3, spray nozzle 408 may be fluidly coupled to a liquid $CO_2$ source (not shown) via a supply line (not shown). A pump (not shown) may be used to pump liquid $CO_2$ from the liquid $CO_2$ source through spray nozzle 408 and to control a pressure of the liquid $CO_2$. As liquid $CO_2$ exits spray nozzle 408, the liquid $CO_2$ may be converted to a $CO_2$ stream 410 (i.e., a stream of solid $CO_2$ particles and/or liquid $CO_2$ droplets) directed toward article 402. In some embodiments, the fixed distance between spray nozzle 408 and article 402 may depend on a pressure (and/or a flow rate) of $CO_2$ stream 410. For example, if $CO_2$ stream 410 is being directed toward article 402 at a pressure of between about 400 psi to about 1,200 psi, the fixed distance between spray nozzle 408 and article 402 may be between about 0.25 inches and 4 inches.

Article 402 may be supported within particle detection system 400 by a support assembly 412. Support assembly may be fixed within particle detection system 400. In some embodiments, support assembly 412 may be a perforated plate or a mesh screen that is configured to support article 402 at the fixed distance between spray nozzle 408 and article 402. In such embodiments, support assembly 412 may prevent positive pressure buildup within particle detection system 400. In one embodiment, support assembly 412 may be made of stainless steel. Surface particles that are dislodged from a surface of article 402 may pass through support assembly 412 during the particle detection process. In other embodiments, support assembly 412 may include one or more grips (not shown), as previously described with respect to FIG. 3.

A substrate 414 may be provided below article 402 to collect a sample of surface particles dislodged from a surface of article 402. In some embodiments, substrate 414 may be displaced at the bottom of particle detection system 400. In other embodiments, substrate 414 may be supported by a substrate support assembly (not shown). Substrate 414 may be any clean surface configured to collect a sample of dislodged surface particles. In some embodiments, substrate 414 may be a clean wafer that has a diameter of 300 nm or smaller. In some embodiments, substrate 414 may be analyzed prior to collecting the portion of dislodged surface particles to determine a morphology, a chemical composition, a particle number concentration, and/or a particle size distribution of all background particles deposited on substrate 414. Responsive to collecting the portion of dislodged surface particles, substrate 414 may be analyzed to determine a size, a morphology, a chemical composition, a particle number concentration, and/or a particle size distribution of all particles on the surface of substrate 414. Based on the analysis performed prior to the collection of dislodged surface particles, and the analysis performed after the collection of dislodged surface particles, a size, a morphology, a chemical composition, a particle number concentration, and/or a particle size distribution may be determined for all dislodged surface particles collected by substrate 414.

In some embodiments, $CO_2$ stream 410 may cause turbulent flow 416 within particle detection system 400. Turbulent flow 416 may facilitate the transport of the dislodged particles (which may become airborne) from the surface of article 402 to substrate 414. Turbulent flow 416 may also ensure the dislodged surface particles are mixed thoroughly inside system body 404. In some embodiments system body 404 may include one or more openings 418, where the interior of system body 404 is exposed to the exterior system body 404. Openings 418 may minimize positive pressure buildup inside system body 404 caused by turbulent flow 416.

Figure 5:
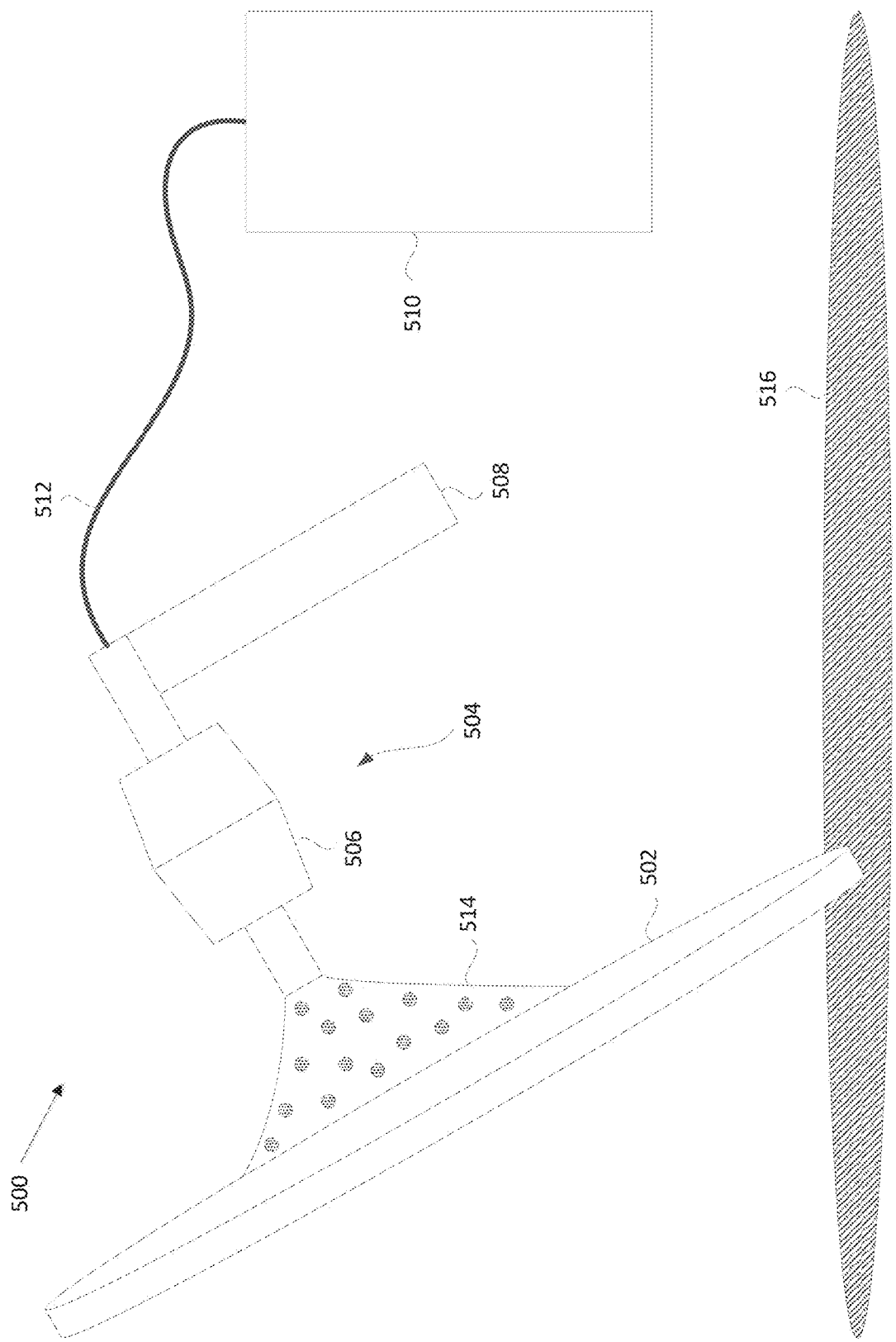
FIG. 5 depicts a sectional view of a portable particle detection unit, in accordance with other embodiments of the present disclosure.

In some embodiments, a real-time aerosol sampling component 420 may be provided within particle detection system 400. Aerosol sampling component 420 may be configured to collect at least a portion of dislodged surface particles from a surface of article 402 and determine, in real time, a particle number concentration, a particle size and/or a particle size distribution of the portion of collected dislodged surface particles. Aerosol sampling component 420 may include at least one of an optical particle counter, a laser particle counter, an aerodynamic particle sizer, a condensation particle counter, or an ultrafine condensation particle counter FIG. 5 depicts a sectional view of a portable particle detection unit 500, in accordance with other embodiments of the present disclosure. The portable particle detection unit 500 may be the same or similar to particle detection 205 described with respect to FIG. 2. Portable particle detection unit 500 may be configured to dislodge at least a portion of surface particles from at least one surface of an article 502. Article 502 may be any suitable chamber component described with respect to FIG. 1 and FIG. 3.

Portable particle detection unit 500 may include a hand-held $CO_2$ jet 504. Hand-held $CO_2$ jet 504 may include a distribution unit, such as spray nozzle 506, and a handle 508. As described with respect to FIG. 3, spray nozzle 506 may be fluidly coupled to a liquid $CO_2$ source 510 via a supply line 512. In some embodiments, liquid $CO_2$ source 510 may be a tank filled with compressed $CO_2$. In other embodiments, liquid $CO_2$ source 308 may be a portable $CO_2$ container. Liquid $CO_2$ may be pumped from liquid $CO_2$ source 510 through spray nozzle 506. As liquid $CO_2$ exits spray nozzle 506, the liquid $CO_2$ may be converted to a $CO_2$ stream 514 (i.e., a stream of solid $CO_2$ particles and/or liquid $CO_2$ droplets) directed toward article 502. An operator may use handle 508 to move hand-held $CO_2$ jet 504 in relation to article 502. The operator may use handle 508 to control the distance between spray nozzle 506 and article 502, the angle that $CO_2$ stream 514 is being directed toward article 502, and/or a portion of article 502 in which $CO_2$ stream 514 is directed. $CO_2$ stream 514 may cause at least a portion of surface particles on article 502 to be dislodged from at least one surface.

A substrate 516 may be configured with respect to article 502 such that substrate 516 is to collect at least a portion of dislodged surface particles from one or more surfaces of article 502. Article 502 may be angled such that, when $CO_2$ stream 514 is directed toward article 502, a portion of surface particles dislodged from a surface of article 502 may be transported toward substrate 516 by gravitational force. In some embodiments, substrate 516 may be analyzed prior to collecting the portion of dislodged surface particles to determine a morphology, a chemical composition, a particle number concentration, and/or a particle size distribution of all background particles deposited on substrate 516. Responsive to collecting the portion of dislodged surface particles, substrate 516 may be analyzed to determine a size, a morphology, a chemical composition, a particle number concentration, and/or a particle size distribution of all particles on the surface of substrate 516. Based on the analysis performed prior to the collection of dislodged surface particles, and the analysis performed after the collection of dislodged surface particles, a size, a morphology, a chemical composition, a particle number concentration, and/or a particle size distribution may be determined for all dislodged surface particles collected by substrate 516.

Figure 6:
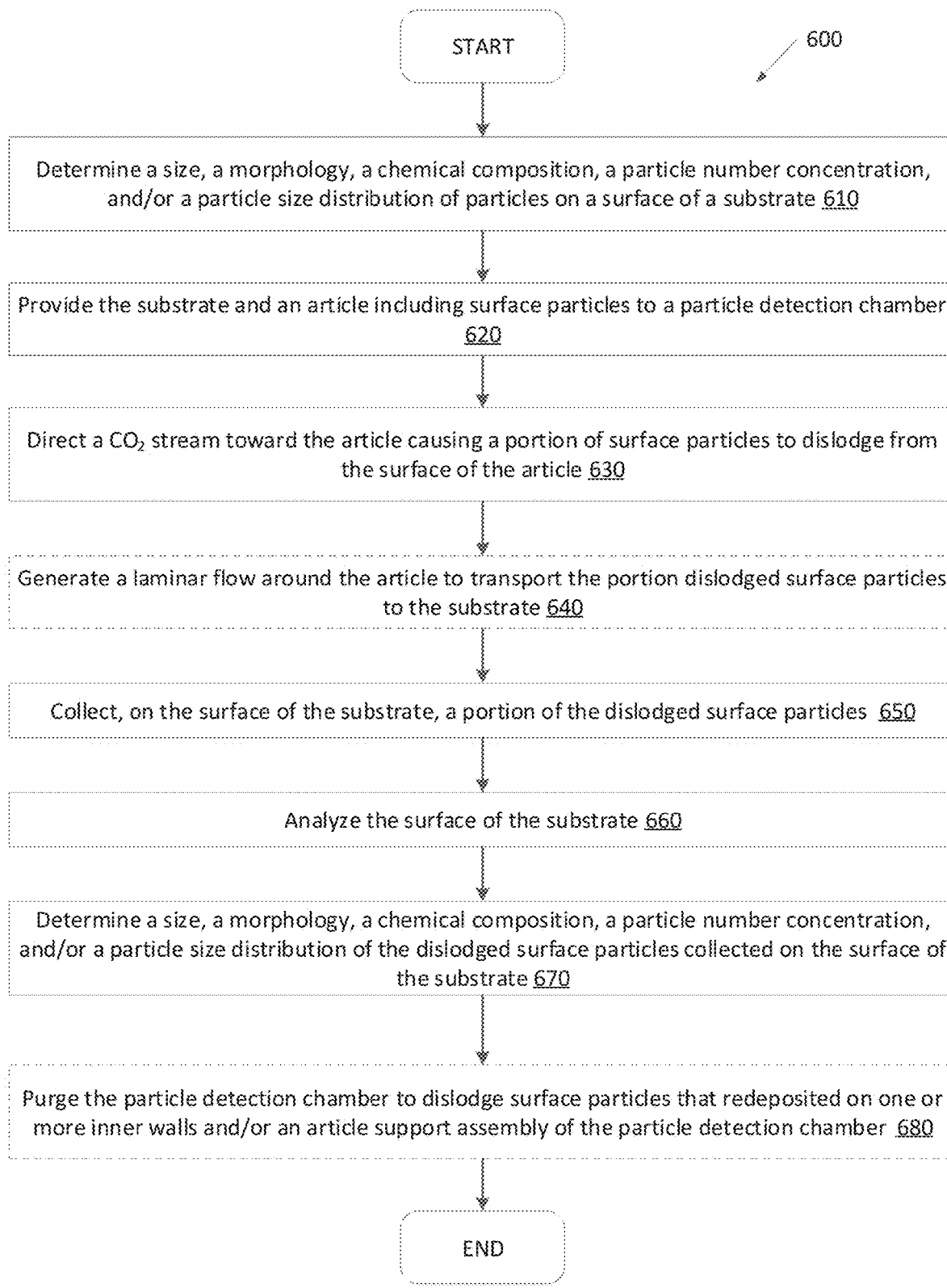
FIG. 6 illustrates a method for detecting and measuring particles on one or more surfaces of an article, in accordance with embodiments of the present disclosure.

FIG. 6 illustrates a method 600 for detecting and measuring particles on one or more surfaces of an article, in accordance with embodiments of the present disclosure. At block 610, a size, a morphology, a chemical composition, a particle number concentration, and/or a particle size distribution of surface particles on a surface of a substrate may be determined. In some embodiments, the substrate may be analyzed by various metrologies, such as SEM/EDX metrology, or by a surface scanning metrology apparatus to determine a particle size and total particle count on the substrate. A size, a morphology, a chemical composition, a particle number concentration, and/or a particle size distribution of surface particles on the surface of the substrate may be determined prior to collecting dislodged surface particles from one or more surfaces of an article so to identify characteristics associated with particles present within the particle detection system (i.e., background particles) prior to initiation of the surface particle collection process.

At block 620, the substrate and an article including surface particles is provided to a particle detection system. In some embodiments, the particle detection system may be particle detection chamber 300 of FIG. 3, particle detection system 400 of FIG. 4, or portable particle detection unit 500 of FIG. 5. The article may be supported within the particle detection system by an article support assembly, while the substrate may be supported by a substrate support assembly. The article support assembly may be automatically and/or manually adjustable to position the article during the particle detection process, and may be capable of rotating, tilting, or translating the article in three dimensions. The substrate may be provided within the particle detection system so to collect a sample of surface particles dislodged from a surface of the article (i.e., below the article, as illustrated in FIG. 3, on a side of the particle detection system, etc.).

At block 630, a stream of solid $CO_2$ particles and/or $CO_2$ droplets ($CO_2$ stream) is directed toward the article, causing a portion of surface particles to dislodge from the surface of the article. The $CO_2$ stream may be provided by a distribution unit, such as a spray nozzle, within the particle detection system that is configured to direct the $CO_2$ stream toward a surface of the article. The distribution unit may be fluidly coupled to a liquid $CO_2$ source via a supply line, where the liquid $CO_2$ may be pumped from the liquid $CO_2$ source through the distribution unit and be converted into the $CO_2$ stream. The $CO_2$ stream may cause a portion of the surface particles to be dislodged from the surface of the article be transported to the substrate.

At block 640, a laminar flow may be generated around the surface of the article to facilitate transportation of the dislodged surface particles to the substrate. The laminar flow may be generated by providing carrier air through a flow straightener provided at an inlet of the particle detection system. In some embodiments, the carrier air is passed through a pre-filter provided along with the flow straightener at the inlet of the particle detection system to remove background particles from the carrier air. In one embodiment, a high efficiency particulate air filter may also be provided with the flow straightener to remove additional particles that were not removed by the pre-filter. In some embodiments, one or more particle charge neutralizers may be provided within the particle detection system to remove an amount of charge carried by dislodged surface particles, thereby reducing particle transport loss due to electrostatic attraction.

At block 650, a portion of the surface particles dislodged from the surface of the article is collected on the surface of the substrate. At block 660, the surface of the substrate is analyzed to determine a size, a morphology, a chemical composition, a particle number concentration, and/or a particle size distribution of all particles on the surface of the substrate. In some embodiments, the substrate may be analyzed by various metrologies, such as SEM/EDX metrology. In other embodiments, a particle size and total particle count on the substrate may be analyzed by a surface scanning metrology apparatus.

At block 670, a size, a morphology, a chemical composition, a particle number concentration, and/or a particle size distribution of the dislodged surface particles collected on the surface of the substrate is determined. These particle properties may be determined using any of the aforementioned metrology devices and/or techniques. The size, morphology, chemical composition, particle number concentration, and/or particle size distribution may be determined by subtracting the corresponding values determined at block 610 from the corresponding values of the analysis performed at block 660. By subtracting the values of block 610 from the values of block 660, a remainder is determined, which indicates a size, a morphology, a chemical composition, a particle number concentration, and/or a particle size distribution of the dislodged surface particles collected by the substrate.

In some embodiments, a real-time aerosol sampling component may be provided in parallel with the substrate. The aerosol sampling component may collect a portion of dislodged surface particles and determine, in real time, a particle number concentration, a particle size, and/or a particle size distribution of the dislodged surface particles.

At block 680, the particle detection system may be purged to dislodge the surface particles redeposited on one or more inner walls of the particle detection chamber after the $CO_2$ stream was directed toward the surface of the article. In some embodiments, the particle detection system may be purged using aggressive filtered CDA. One or more CDA nozzles may be provided within the particle detection system may be targeted toward an inner wall of the particle detection system and may provide CDA to remove a portion of the redeposited surface particles. In some embodiments, a velocity of the laminar flow described with respect to block 640 may be increased significantly to facilitate dislodging and transport of the redeposited surface particles on the inner wall of the particle detection system. In some embodiments, after one or more particle detection cycles, one or more inner wall surfaces of the particle detection system, and/or the article support assembly, may be cleaned using an IPA solution to remove at least a portion of redeposited particles, in accordance with previously described embodiments.

FIG. 7 illustrates a method 700 for detecting and measuring surface particles from a surface of an article, in accordance with embodiments of the present disclosure. At block 710, a particle number concentration, a particle size, and/or a particle size distribution for background particles in a particle detection system is determined using a real-time aerosol sampling component. The aerosol sampling component may be configured to collect a portion of background particles and determine, in real time, a particle number concentration, a particle size and/or a particle size distribution of the portion of the collected background particles. The aerosol sampling component may include at least one of an optical particle counter, a laser particle counter, an aerodynamic particle sizer, a condensation particle counter, or an ultrafine condensation particle counter At block 720, an article is provided to the particle detection system. In some embodiments, the particle detection system may be particle detection chamber 300 of FIG. 3 or particle detection system 400 of FIG. 4. The article may be supported within the particle detection system by an article support assembly. The article support assembly may be automatically and/or manually adjustable to position the article during the particle detection process, and may be capable of rotating, tilting, or translating the article in three dimensions.

At block 730, a stream of solid $CO_2$ particles and/or $CO_2$ droplets ($CO_2$ stream) is directed toward the article, causing a portion surface particles to dislodge from a surface of the article. The $CO_2$ stream may be provided by a distribution unit, such as a spray nozzle, within the particle detection system that is configured to direct the $CO_2$ stream toward a surface of the article. The distribution unit may be fluidly coupled to a liquid $CO_2$ source via a supply line, where the liquid $CO_2$ may be pumped form the liquid $CO_2$ source through the distribution unit and converted into the $CO_2$ stream. The $CO_2$ stream may cause a portion surface particles to be dislodged from the surface of the article and transported to the aerosol sampling component. At block 740, a laminar flow may be generated around the article to transport the portion of surface particles dislodged from the surface of the article to the aerosol sampling component. In some embodiments, one or more particle charge neutralizers provided within the particle detection system may remove an amount of charge carried by dislodged surface particles, thereby reducing particle transport loss due to electrostatic attraction.

At block 750, a portion dislodged surface particles is collected by the aerosol sampling component. The aerosol sampling component may determine, in real time, a particle number concentration, a particle size and/or a particle size distribution of the portion of collected dislodged surface particles.

At block 760, a particle number concentration, a particle size, and/or a particle size distribution for dislodged surface particles collected by the aerosol sampling component is determined. The particle number concentration, particle size, and/or particle size distribution may be determined by subtracting the corresponding values determined at block 710 from the corresponding values of the analysis performed at block 750. By subtracting the values of block 710 from the values of block 750, a remainder is determined, which indicates a size, a morphology, a chemical composition, a particle number concentration, and/or a particle size distribution of the dislodged surface particles dislodged collected by the aerosol sampling component.

At block 770, the particle detection chamber may be purged to dislodge surface particles were redeposited on one or more inner walls of the particle detection chamber after the $CO_2$ stream was directed toward the surface of the article. In some embodiments, the particle detection system may be purged using aggressive filtered CDA. One or more CDA nozzles may be provided within the particle detection system may be targeted toward an inner wall of the particle detection system and may provide CDA to remove a portion of the redeposited surface particles. In some embodiments, a velocity of the laminar flow described with respect to block 740 may be increased significantly to facilitate dislodging and transport of the redeposited surface particles on the inner wall of the particle detection system. In some embodiments, after one or more particle detection cycles, one or more inner wall surfaces of the particle detection system, and/or the article support assembly, may be cleaned using an IPA solution to remove a portion of redeposited surface particles, in accordance with previously described embodiments.

Figure 8:
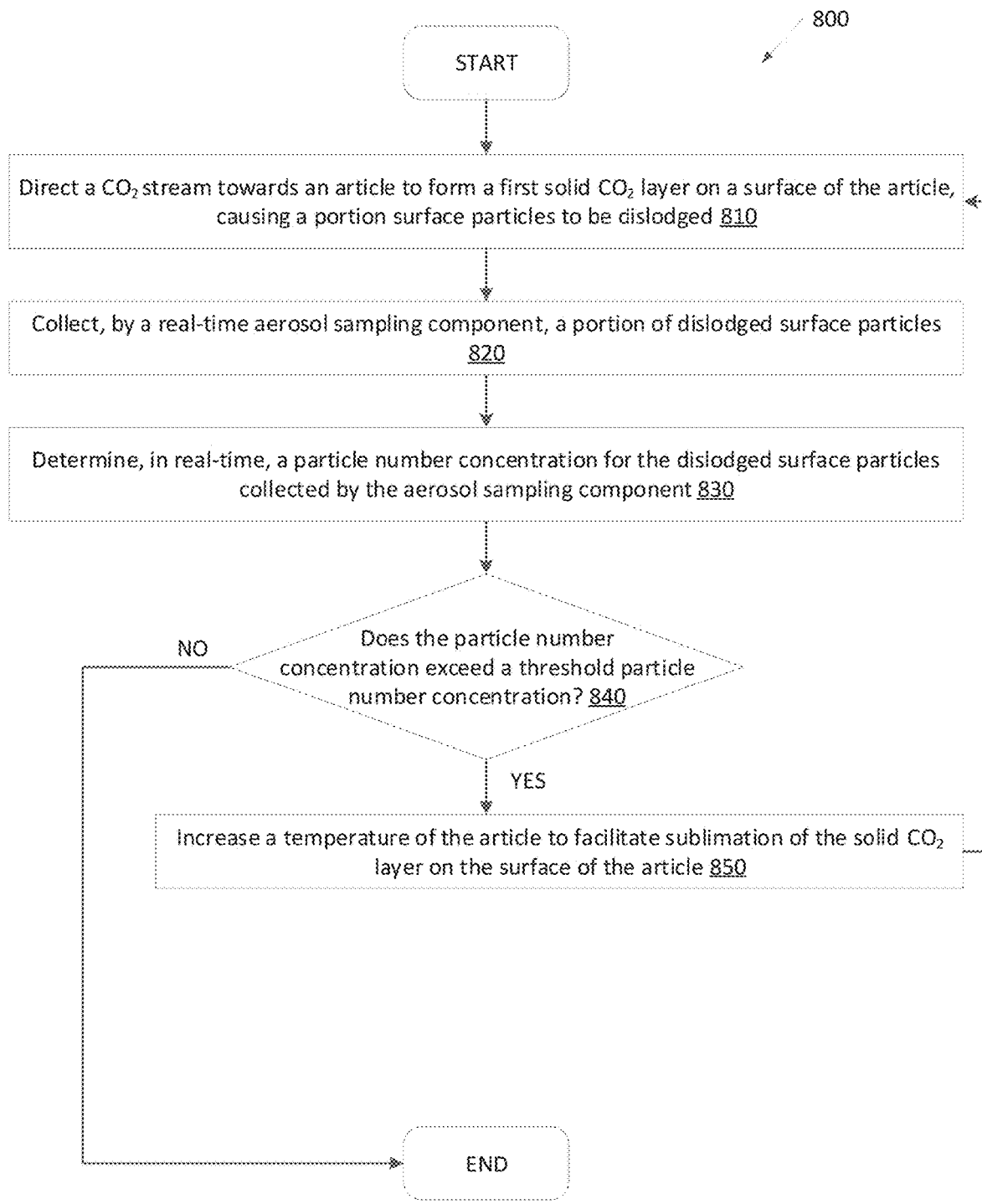
FIG. 8 illustrates a method for dislodging particles on one or more surfaces of an article, in accordance with embodiments of the present disclosure.

FIG. 8 illustrates a method 800 for dislodging particles on one or more surfaces of an article, in accordance with embodiments of the present disclosure. At block 810, a stream of solid $CO_2$ particles and/or $CO_2$ droplets ($CO_2$ stream) is directed toward the article, causing a portion of surface particles to dislodge from the surface of the article. The $CO_2$ stream may be provided by a distribution unit, such as a spray nozzle, within the particle detection system that is configured to direct the $CO_2$ stream toward the article, in accordance with embodiments previously described herein. A first solid layer of $CO_2$ may form on the surface of the article. The $CO_2$ stream may cause a portion of surface particles to be dislodged from the surface of the article.

At block 820, the portion of dislodged surface particles is collected by a real-time aerosol sampling component. The aerosol sampling component may include at least one of an optical particle counter, a laser particle counter, an aerodynamic particle sizer, a condensation particle counter, or an ultrafine condensation particle counter. At block 830, a particle number concentration for the dislodged surface particles collected by the aerosol sampling component is determined, in accordance with embodiments previously described herein. At block 840, it is determined whether the particle number concentration exceeds a threshold particle number concentration. In some embodiments, the threshold particle number concentration may be 1 particle/$cm^3$.

Responsive to determining that the particle number concentration exceeds a threshold particle number concentration, method 800 may continue to block 850, where a temperature of the article is increased to facilitate sublimation of the first solid $CO_2$ layer on the surface of the article. In some embodiments, the temperature of the article may be increased by increasing a temperature of the article support assembly. In other embodiments, the temperature of the article may be increased by increasing a temperature of the laminar flow. After the first solid $CO_2$ layer on the surface of the article has sublimated, method 800 may return to block 810, where a second $CO_2$ stream is directed toward the surface of the article to form a second solid $CO_2$ layer on the surface of the article, causing a second portion of surface particles to be dislodged. Responsive to determining that the particle number concentration does not exceed a threshold particle number concentration, method 800 may terminate.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   directing a stream comprising at least one of solid $CO_2$ particles or $CO_2$ droplets toward an article, wherein the article comprises a plurality of surface particles, and wherein the stream comprising at least one of solid $CO_2$ particles or $CO_2$ droplets causes at least a portion of the plurality of surface particles on the article to dislodge from a surface of the article;
   initiating a purge cycle to transport at least some of a portion of the plurality of surface particles dislodged from the surface of the article away from the surface of the article, wherein the purge cycle comprises generating a laminar flow at a first velocity for a first time period and subsequently generating a laminar flow at a second velocity for a second time period;
   determining whether a number of particles transported away from the surface of the article satisfies a particle criterion; and
   responsive to determining that the number of particles transported away from the surface of the article does not satisfy the particle criterion, re-initiating the purge cycle.

2. The method of claim 1, wherein the first velocity is higher than the second velocity.

3. The method of claim 1, further comprising:
   collecting, on a surface of a substrate having a pre-determined initial state comprising initial surface particles on the surface of the substrate, at least some of the particles transported away from the surface of the article;
   analyzing the surface of the substrate after performing the collecting; and
   determining the number of particles transported away from the surface of the article based on the analysis.

4. The method of claim 3, wherein analyzing the surface of the substrate after performing the collecting comprises:
   determining a particle number concentration of all detectable surface particles on the substrate; and
   subtracting out a particle number concentration of predetermined particles included in the initial state,
   wherein a remainder of the particle number concentration on the substrate represents the number of particles transported away from the surface of the article.

5. The method of claim 1, further comprising:
   determining, based on an analysis of the at least some of the portion of the plurality of surface particles dislodged from the surface of the article, information about at least one of a size, a morphology, a chemical composition, a particle concentration, or a particle size distribution of a remainder of surface particles on the surface of the article.

6. The method of claim 1, further comprising:
   reducing, by one or more particle charge neutralizers, a charge of the portion of the plurality of surface particles dislodged from the surface of the article such to facilitate transport of the at least some of the portion of the plurality of surface particles.

7. The method of claim 1, wherein directing the stream comprising at least one of solid $CO_2$ particles or $CO_2$ droplets toward the article comprises:
   forming a first layer of solid $CO_2$ on the surface of the article, wherein the first layer of solid $CO_2$ causes the portion of the plurality of surface particles to be dislodged from the surface of the article, and wherein at least a portion of the dislodged surface particles are to collect on the surface of the article;
   increasing a temperature of the article to facilitate sublimation of the first layer of solid $CO_2$; and
   forming a second layer of solid $CO_2$ on the surface of the article, wherein the second layer of solid $CO_2$ causes the portion of the dislodged surface particles to be dislodged from the surface of the article.

8. The method of claim 1, wherein directing the stream comprising at least one of solid $CO_2$ particles or $CO_2$ droplets towards the article comprises:
   flowing liquid $CO_2$ into a distribution unit, wherein the liquid $CO_2$ is converted into at least one of solid $CO_2$ particles or $CO_2$ droplets upon exiting the distribution unit.

9. An apparatus comprising:
   a distribution unit configured to generate a stream comprising at least one of solid $CO_2$ particles or $CO_2$ droplets;
   a controller connected to the distribution unit, wherein the controller is to:
      determine a target region of an article comprising a plurality of surface particles; and
      direct the stream comprising at least one of solid $CO_2$ particles or $CO_2$ droplets towards the determined target region of the article, wherein the stream causes at least a portion of the plurality of surface particles at the target region of the article to dislodge from a surface of the article, and wherein at least an additional portion of the plurality of surface particles that are not at the target region of the article to remain on the surface of the article; and
   a particle collection receptacle to collect the portion of the plurality of surface particles dislodged from the surface of the article, wherein the collected portion of the plurality of surface particles is to be analyzed to determine at least one of a particle size, a morphology, a chemical composition, a particle number concentration, a particle size, or a particle size distribution.

10. The apparatus of claim 9, wherein the controller is further to:
    determine an additional target region of the article; and
    re-direct the stream comprising at least one of solid $CO_2$ particles or $CO_2$ droplets towards the additional target region of the article, wherein the stream causes at least another portion of the plurality of surface particles at the additional target region of the article to dislodge from the surface of the article.

11. The apparatus of claim 9, wherein information about at least one of a size, a morphology, a chemical composition, a particle number concentration, or a particle size distribution of a remainder of the plurality of surface particles on the article is determined based on a determination of at least one of a size, a morphology, a chemical composition, a particle number concentration, or a particle size distribution of the portion of the plurality of surface particles that were dislodged from the surface of the article and collected by the particle collection receptacle.

12. The apparatus of claim 9, further comprising a laminar flow component configured to generate a laminar flow around the article to transport the portion of the plurality of surface particles that were dislodged from the surface of the article to the particle collection receptacle.

13. The apparatus of claim 9, further comprising one or more particle charge neutralizers configured to reduce a charge of the portion of the plurality of surface particles that were dislodged from the surface of the article such to facilitate transport to the particle collection receptacle.

14. The apparatus of claim 9, further comprising a liquid $CO_2$ source fluidly coupled to the distribution unit, wherein liquid $CO_2$ is configured to flow from the liquid $CO_2$ source into the distribution unit such that the liquid $CO_2$ is converted into at least one of solid $CO_2$ particles or $CO_2$ droplets upon exiting the distribution unit.

15. The apparatus of claim 9, wherein the particle collection receptacle is a substrate having a pre-determined initial state comprising initial surface particles on a surface of the substrate, and wherein the controller is further to:
analyze the initial surface particles on the surface of the substrate and the collected portion of the plurality of surface particles to determine the at least one of the particle size, the morphology, the chemical composition, the particle number concentration, the particle size, or the particle size distribution.

16. The apparatus of claim 9, wherein the particle collection receptacle is a real-time aerosol sampling component.

17. An apparatus comprising:
a distribution unit configured to generate a stream comprising at least one of solid $CO_2$ particles or $CO_2$ droplets;
a controller connected to the distribution unit, wherein the controller is to:
direct the stream comprising the at least one of solid $CO_2$ particles or $CO_2$ droplets toward an article comprising a plurality of surface particles while continuously changing a position of the stream relative to a surface of the article, wherein the stream causes at least a portion of the plurality of surface particles on the article to dislodge from the surface of the article while the position of the stream is continuously changing; and
a particle collection receptacle to collect the portion of the plurality of surface particles dislodged from the surface of the article, wherein the collected portion of the plurality of surface particles is to be analyzed to determine at least one of a particle size, a morphology, a chemical composition, a particle number concentration, a particle size, or a particle size distribution.

18. The apparatus of claim 17, wherein the controller is to direct the stream comprising the at least one of solid $CO_2$ particles or $CO_2$ droplets toward the article while continuously changing the position of the stream according to at least one of a continuous line pattern or a circular pattern relative to the surface of the article.

19. The apparatus of claim 17, wherein the controller is to direct the stream comprising the at least one of solid $CO_2$ particles or $CO_2$ droplets toward the article while continuously changing the position of the stream relative to the surface of the article at a constant velocity.

20. The apparatus of claim 17, wherein the particle collection receptacle comprises at least one of a substrate having a pre-determined initial state comprising surface particles on a surface of the substrate or a real-time aerosol sampling component.

* * * * *